US010977639B2

(12) United States Patent
Massoudi et al.

(10) Patent No.: US 10,977,639 B2
(45) Date of Patent: Apr. 13, 2021

(54) ADAPTIVE GATEWAY SWITCHING SYSTEM

(71) Applicant: Freelancer Technology Pty Limited, Sydney (AU)

(72) Inventors: Amir Massoudi, Sydney (AU); Jun Yao, Telopea (AU); Joseph Noel, Quezon (PH); Conrad Marco Egamino Olega, Quezon (PH); Darren Nicholas John Williams, Newtown (AU); Muhammad Umer Farooq, Randwick (AU)

(73) Assignee: FREELANCER TECHNOLOGY PTY LIMITED, Sydney (AU)

( * ) Notice: Subject to any disclaimer, the term of this patent is extended or adjusted under 35 U.S.C. 154(b) by 607 days.

(21) Appl. No.: 15/173,264

(22) Filed: Jun. 3, 2016

(65) Prior Publication Data

US 2017/0213204 A1 Jul. 27, 2017

Related U.S. Application Data

(60) Provisional application No. 62/286,934, filed on Jan. 25, 2016.

(51) Int. Cl.
*G06Q 20/24* (2012.01)
*G06Q 20/02* (2012.01)
(Continued)

(52) U.S. Cl.
CPC ........... *G06Q 20/24* (2013.01); *G06Q 20/027* (2013.01); *G06Q 20/10* (2013.01); *G06Q 20/34* (2013.01); *H04L 67/02* (2013.01)

(58) Field of Classification Search
CPC ........ G06Q 20/22; G06Q 20/40; G06Q 30/00; G06Q 40/00
(Continued)

(56) References Cited

U.S. PATENT DOCUMENTS 6,526,130 B1    2/2003  Paschini
7,013,289 B2 *  3/2006  Horn .................... G06Q 10/087
                                                705/14.51
(Continued)

FOREIGN PATENT DOCUMENTS

AU    2006263434    1/2007
AU    2011203954    7/2012
(Continued)

OTHER PUBLICATIONS

International Search Report and Written Opinion for PCT Application No. PCT/AU2017/050057 dated May 10, 2017, 15 pages.
(Continued)

*Primary Examiner* — Kirsten S Apple
*Assistant Examiner* — Martin A Gottschalk
(74) *Attorney, Agent, or Firm* — Amin, Turocy & Watson, LLP

(57) ABSTRACT

Systems and methods disclosed herein relate to reducing the losses associated with processing payments using credit card payment processing gateways. Payment processing gateways have different deposit success rates due to the gateways' varying arrangements with acquiring banks and the ability to process certain types of payments. A payment request related to a user may be received, wherein the request specifies a particular type of credit card, a transaction currency, and an amount. A payment application then routes, via a payment agent, the payment request to an adaptive gateway switching system (AGSS) in an attempt to complete a payment transaction. If in learning mode, the AGSS may randomly choose a payment processing gateway. Or the AGSS may choose the gateway based upon a learned gateway status based upon results learned through reinforcement learning. Upon receiving the result of a transaction attempt from the gateway, the agent reports the result to the
(Continued)

AGSS. The result is used to update a reward function to inform future attempts to process payments. If the transaction attempt was unsuccessful, the AGSS provides an alternative gateway option for the agent to contact and attempt the transaction. This may continue until one of the following occurs: success; all gateways have been attempted; a predetermined number of gateways has been attempted; a predetermined penalty threshold has been exceeded; or another relevant criterion has been satisfied.

20 Claims, 7 Drawing Sheets

(51) Int. Cl.
  *G06Q 20/10* (2012.01)
  *G06Q 20/34* (2012.01)
  *H04L 29/08* (2006.01)
(58) Field of Classification Search
  USPC .......................................................... 705/35
  See application file for complete search history.

(56) References Cited

U.S. PATENT DOCUMENTS

| | | | |
|---|---|---|---|
| 7,131,578 | B2 | 11/2006 | Paschini et al. |
| 7,280,644 | B2 | 10/2007 | Tamari et al. |
| 7,477,731 | B2 | 1/2009 | Tamari et al. |
| 7,522,716 | B2 | 4/2009 | Paschini |
| 7,676,030 | B2 | 3/2010 | New et al. |
| 7,774,402 | B2 | 8/2010 | Singh et al. |
| 7,909,242 | B2 | 3/2011 | Paschini et al. |
| 8,316,237 | B1 * | 11/2012 | Felsher ................ H04L 9/0825 713/171 |
| 8,472,594 | B2 | 6/2013 | New et al. |
| 8,479,980 | B2 | 7/2013 | Paschini et al. |
| 8,521,567 | B2 * | 8/2013 | Varanasi ................ G06Q 10/10 705/4 |
| 8,571,937 | B2 | 10/2013 | Rose et al. |
| 8,594,286 | B2 | 11/2013 | New et al. |
| 8,639,846 | B2 | 1/2014 | Singh et al. |
| 8,849,075 | B2 | 9/2014 | Painter et al. |
| 8,867,713 | B2 | 10/2014 | New et al. |
| 8,967,464 | B2 | 3/2015 | Paschini et al. |
| 9,355,393 | B2 | 5/2016 | Purves et al. |
| 9,558,484 | B2 | 1/2017 | Paschini et al. |
| 9,582,598 | B2 | 2/2017 | Kalgi |
| 10,074,219 | B2 * | 9/2018 | Wilson .................... G06Q 40/08 |
| 2002/0099656 | A1 * | 7/2002 | Poh Wong ............. G06Q 20/04 705/40 |
| 2003/0095646 | A1 | 5/2003 | Paschini |
| 2005/0008132 | A1 | 1/2005 | Paschini et al. |
| 2005/0061872 | A1 | 3/2005 | Paschini et al. |
| 2005/0123112 | A1 | 6/2005 | New et al. |
| 2005/0229003 | A1 | 10/2005 | Paschini et al. |
| 2006/0120519 | A1 | 6/2006 | Tamari et al. |
| 2006/0224508 | A1 * | 10/2006 | Fietz ...................... G06Q 20/10 705/40 |
| 2006/0248009 | A1 * | 11/2006 | Hicks ..................... G06Q 20/00 705/40 |
| 2007/0005774 | A1 | 1/2007 | Singh et al. |
| 2007/0047703 | A1 | 3/2007 | Paschini et al. |
| 2007/0078761 | A1 * | 4/2007 | Kagan .................... G06Q 20/02 705/39 |
| 2008/0165941 | A1 | 7/2008 | Tamari et al. |
| 2010/0036743 | A1 | 2/2010 | Tamari et al. |
| 2010/0254522 | A1 | 10/2010 | New et al. |
| 2010/0280911 | A1 | 11/2010 | Roberts et al. |
| 2010/0299221 | A1 | 11/2010 | Paschini et al. |
| 2010/0299733 | A1 | 11/2010 | Paschini et al. |
| 2011/0047294 | A1 | 2/2011 | Singh et al. |
| 2011/0270693 | A1 | 11/2011 | Paschini et al. |
| 2012/0123924 | A1 | 5/2012 | Rose et al. |
| 2012/0124496 | A1 | 5/2012 | Rose et al. |
| 2012/0209677 | A1 | 8/2012 | Mehta et al. |
| 2012/0209749 | A1 | 8/2012 | Hammad et al. |
| 2012/0215648 | A1 | 8/2012 | Rose et al. |
| 2012/0215701 | A1 | 8/2012 | Mehta et al. |
| 2012/0233073 | A1 | 9/2012 | Salmon et al. |
| 2012/0239556 | A1 | 9/2012 | Magruder et al. |
| 2012/0317028 | A1 | 12/2012 | Ansari |
| 2013/0010941 | A1 | 1/2013 | New et al. |
| 2013/0013430 | A1 | 1/2013 | Roberts et al. |
| 2013/0013499 | A1 | 1/2013 | Kalgi |
| 2013/0013510 | A1 | 1/2013 | Ansari |
| 2013/0018783 | A1 | 1/2013 | Ansari |
| 2013/0024364 | A1 | 1/2013 | Shrivastava et al. |
| 2013/0024371 | A1 | 1/2013 | Hariramani et al. |
| 2013/0036019 | A1 | 2/2013 | Tamari et al. |
| 2013/0036048 | A1 | 2/2013 | Campos et al. |
| 2013/0041768 | A1 | 2/2013 | Llach |
| 2013/0046655 | A1 * | 2/2013 | Karkera ............... G06Q 20/027 705/26.41 |
| 2013/0054454 | A1 | 2/2013 | Purves et al. |
| 2013/0054470 | A1 | 2/2013 | Campos et al. |
| 2013/0066701 | A1 | 3/2013 | Roberts et al. |
| 2013/0066735 | A1 | 3/2013 | Llach |
| 2013/0121633 | A1 | 5/2013 | Painter et al. |
| 2013/0151417 | A1 | 6/2013 | Gupta |
| 2013/0159081 | A1 | 6/2013 | Shastry et al. |
| 2013/0159154 | A1 | 6/2013 | Purves et al. |
| 2013/0166332 | A1 | 6/2013 | Hammad |
| 2013/0197986 | A1 | 8/2013 | Roberts et al. |
| 2013/0204686 | A1 | 8/2013 | Roberts et al. |
| 2013/0204723 | A1 | 8/2013 | Roberts et al. |
| 2013/0204886 | A1 | 8/2013 | Faith et al. |
| 2013/0204894 | A1 | 8/2013 | Faith et al. |
| 2013/0218657 | A1 | 8/2013 | Salmon et al. |
| 2013/0218684 | A1 | 8/2013 | Roberts et al. |
| 2013/0246215 | A1 | 9/2013 | Faith et al. |
| 2013/0246261 | A1 | 9/2013 | Purves et al. |
| 2013/0246342 | A1 | 9/2013 | Faith et al. |
| 2013/0290203 | A1 | 10/2013 | Purves et al. |
| 2013/0290234 | A1 | 10/2013 | Harris et al. |
| 2014/0006268 | A1 | 1/2014 | Roberts et al. |
| 2014/0012640 | A1 | 1/2014 | Roberts et al. |
| 2014/0019352 | A1 | 1/2014 | Shrivastava |
| 2014/0052617 | A1 | 2/2014 | Chawla et al. |
| 2014/0108170 | A1 | 4/2014 | Tamari et al. |
| 2014/0122331 | A1 | 5/2014 | Vaish et al. |
| 2014/0129436 | A1 | 5/2014 | New et al. |
| 2014/0195425 | A1 | 7/2014 | Campos et al. |
| 2014/0197234 | A1 | 7/2014 | Hammad |
| 2014/0200997 | A1 | 7/2014 | Anderson et al. |
| 2014/0213344 | A1 | 7/2014 | Rose et al. |
| 2014/0214567 | A1 | 7/2014 | Llach et al. |
| 2014/0214575 | A1 | 7/2014 | Paschini et al. |
| 2014/0214653 | A1 | 7/2014 | Rose et al. |
| 2014/0222594 | A1 | 8/2014 | Rose et al. |
| 2014/0229319 | A1 | 8/2014 | Roberts et al. |
| 2014/0249999 | A1 | 9/2014 | Johnson et al. |
| 2014/0337175 | A1 | 11/2014 | Katzin et al. |
| 2014/0344149 | A1 | 11/2014 | Campos |
| 2014/0372234 | A1 | 12/2014 | Tikku |
| 2015/0019944 | A1 | 1/2015 | Kalgi |
| 2015/0026049 | A1 | 1/2015 | Theurer et al. |
| 2015/0046241 | A1 | 2/2015 | Salmon et al. |
| 2015/0058162 | A1 | 2/2015 | Purves |
| 2015/0154588 | A1 | 6/2015 | Purves et al. |
| 2015/0170128 | A1 | 6/2015 | Paschini et al. |
| 2015/0178708 | A1 * | 6/2015 | Reutov ................ G06Q 20/405 705/44 |
| 2015/0220914 | A1 | 8/2015 | Purves et al. |
| 2015/0248664 | A1 | 9/2015 | Makhdumi et al. |
| 2015/0248696 | A1 * | 9/2015 | Fernandez ......... G06Q 30/0253 705/14.51 |
| 2015/0302394 | A1 | 10/2015 | Harper |
| 2015/0348018 | A1 | 12/2015 | Campos et al. |
| 2016/0063486 | A1 | 3/2016 | Purves et al. |
| 2016/0086166 | A1 | 3/2016 | Pomeroy et al. |
| 2016/0232513 | A1 | 8/2016 | Purves et al. |
| 2016/0379192 | A1 | 12/2016 | Purves et al. |

(56) References Cited

U.S. PATENT DOCUMENTS

| | | | |
|---|---|---|---|
| 2017/0046679 | A1 | 2/2017 | Gotlieb et al. |
| 2017/0053302 | A1 | 2/2017 | Mason et al. |
| 2017/0148021 | A1* | 5/2017 | Goldstein ............. H04L 67/104 |

FOREIGN PATENT DOCUMENTS

| | | |
|---|---|---|
| AU | 2011268026 | 1/2013 |
| AU | 2011293250 | 3/2013 |
| AU | 2011316955 | 5/2013 |
| AU | 2012217606 | 5/2013 |
| AU | 2012220669 | 5/2013 |
| AU | 2012205511 | 7/2013 |
| AU | 2012262317 | 12/2013 |
| AU | 2012278963 | 1/2014 |
| AU | 2013214801 | 9/2014 |
| AU | 2013221323 | 9/2014 |
| AU | 2013277083 | 1/2015 |
| AU | 2014204010 | 7/2015 |
| AU | 2014232707 | 11/2015 |
| AU | 2014281088 | 1/2016 |
| AU | 2016201087 | 3/2016 |
| AU | 2016203811 | 6/2016 |
| AU | 2016204018 | 7/2016 |
| AU | 2016219581 | 9/2016 |
| AU | 2016219582 | 9/2016 |
| AU | 2017200131 | 2/2017 |
| BR | PI0612847 | 3/2011 |
| CA | 2613295 | 1/2007 |
| CA | 2786264 | 7/2011 |
| CA | 2802687 | 12/2011 |
| CA | 2809822 | 3/2012 |
| CA | 2837208 | 12/2012 |
| CA | 2864743 | 8/2013 |
| CA | 2897145 | 7/2014 |
| CA | 2845580 | 9/2014 |
| CA | 2846522 | 9/2014 |
| CA | 2846601 | 9/2014 |
| CA | 2915818 | 12/2014 |
| CA | 2912066 | 5/2016 |
| CN | 101535975 | 9/2009 |
| CN | 103038790 | 4/2013 |
| CN | 103299331 | 9/2013 |
| CN | 103635920 | 3/2014 |
| CN | 103718200 | 4/2014 |
| CN | 103765453 | 4/2014 |
| CN | 105144216 | 12/2015 |
| CN | 105531728 | 4/2016 |
| EP | 1829352 | 9/2007 |
| EP | 1829354 | 9/2007 |
| EP | 1910934 | 4/2008 |
| EP | 2521999 | 11/2012 |
| EP | 2580729 | 4/2013 |
| EP | 2601632 | 6/2013 |
| EP | 2678812 | 1/2014 |
| EP | 2810242 | 12/2014 |
| EP | 2973276 | 1/2016 |
| EP | 3011498 | 4/2016 |
| GB | 2505382 | 2/2014 |
| GB | 2523972 | 9/2015 |
| HK | 1213076 | 6/2016 |
| IN | 11079DEN2013 | 6/2015 |
| JP | 4934670 | 5/2012 |
| JP | 2014519657 | 8/2014 |
| JP | 2016524198 | 8/2016 |
| JP | 2016553138 | 10/2016 |
| KR | 20130103512 | 9/2013 |
| KR | 20130114633 | 10/2013 |
| KR | 101362469 | 2/2014 |
| KR | 20140038473 | 3/2014 |
| KR | 20160024869 | 3/2016 |
| MX | 2007006925 | 10/2007 |
| MX | 2007006924 | 2/2008 |
| MX | 2012007926 | 8/2012 |
| MX | 2013013903 | 7/2014 |
| NZ | 605666 | 3/2015 |
| RU | 2008103283 | 8/2009 |
| SG | 193481 | 10/2013 |
| SG | 193510 | 10/2013 |
| SG | 11201404555 W | 8/2014 |
| WO | 2004107280 | 12/2004 |
| WO | 2006062832 | 6/2006 |
| WO | 2006062842 | 6/2006 |
| WO | 2007002932 | 1/2007 |
| WO | 2008013945 | 1/2008 |
| WO | 2011085241 | 7/2011 |
| WO | 2011159579 | 12/2011 |
| WO | 2012027664 | 3/2012 |
| WO | 2012054785 | 4/2012 |
| WO | 2012054786 | 4/2012 |
| WO | 2012097108 | 7/2012 |
| WO | 2012112822 | 8/2012 |
| WO | 2012116125 | 8/2012 |
| WO | 2012166790 | 12/2012 |
| WO | 2013006725 | 1/2013 |
| WO | 2013009660 | 1/2013 |
| WO | 2013012876 | 1/2013 |
| WO | 2013044175 | 3/2013 |
| WO | 2013049329 | 4/2013 |
| WO | 2013075071 | 5/2013 |
| WO | 2013090611 | 6/2013 |
| WO | 2013116806 | 8/2013 |
| WO | 2013123438 | 8/2013 |
| WO | 2013192443 | 12/2013 |
| WO | 2014011691 | 1/2014 |
| WO | 2014107594 | 7/2014 |
| WO | 2014145708 | 9/2014 |
| WO | 2014204599 | 12/2014 |

OTHER PUBLICATIONS

Gambardella et al., Ant-Q: A Reinforcement Learning approach to the traveling salesman problem, ML-95, Twelfth Intern. Conf. on Machine Learning, 1995, 9 pages.

Ng et al., Autonomous inverted helicopter flight via reinforcement learning, 10 pages.

Boyan et al., Packet Routing in Dynamically Changing Networks: A Reinforcement Learning Approach, 8 pages.

Mnih et al., Playing Atari with Deep Reinforcement Learning, Dec. 19, 2013, 9 pages.

* cited by examiner

ADAPTIVE GATEWAY SWITCHING SYSTEM

CROSS REFERENCE TO RELATED APPLICATION(S)

This application claims priority to U.S. Provisional application Ser. No. 62/286,934 filed Jan. 25, 2016, the entirety which is incorporated herein by reference.

TECHNICAL FIELD

This application relates to payment processing and more particularly to an adaptive learning system to reduce the costs (including at least monetary and temporal costs) of using payment gateways or acquiring banks.

BACKGROUND

Modern website operators often provide and/or require options for customers and users to pay for various goods and services using various types of credit cards, such as Visa, Mastercard, Discovery, American Express and others. Such payments may be, for example, for services performed by another user. In such situations, the website operator may allow one user to fund an account for paying another user via credit card. In other situations, the website operator may allow a user to pay for the website services or goods offered for sale upon the website or another website using a credit card.

Website operators allowing this type of payment will often provide a payment processing module that may be implemented using software. To ensure that business operations go uninterrupted, a significant goal (and sometimes a primary goal) of many website operators that allow credit card payments is the goal of ensuring that the website users can use their credit cards to make payments, deposit money, or otherwise transact business using the credit card. This is often accomplished by working with a credit card payment or processing gateway and/or acquiring banks.

Such gateways are primarily e-commerce application service providers that authorize credit card payments for e-businesses, online retailers, and other businesses. These gateways include companies and services such as Global Collect (GC), WorldPay (WP), National Australia Bank (NAB), Adyen, Alipay, PayPal, and many others. Acquiring banks are banks or financial institutions that process credit or debit card payments on behalf of a merchant. To simplify the discussion within this application, the terms "gateway" and "processing gateway" may be interchanged with the term acquiring bank in most instances and may be considered to represent either type of company or service. Different gateways may have different success rates with various types of transactions based on their acquiring bank agreements, national laws, and other factors. A particular gateway may or may not be able to successfully process certain types of transactions. For example, one gateway may be unable to process transactions of a U.S. dollars Mastercard issued in the Netherlands, while others may be able to process such transactions. And another gateway may be unable to process transactions of a Euro Visa card issued in France, while others may be able to process such transactions. However, regardless of whether the gateway can process the requested transaction, most gateways will charge a fixed fee for attempting a transaction. If the transaction is unsuccessful, the website operator must still pay this fee to the gateway and then determine whether to attempt the transaction on another gateway.

For example, a gateway may charge a fixed fee of 30 cents for a transaction plus a variable fee of 1.5% of the amount of the transaction. So a $30 transaction would end up costing $0.75 (i.e., 30 cents fixed plus 45 cents variable) if successful. If unsuccessful, the same transaction would still cost $0.30 (i.e., 30 cents fixed plus 0 cents variable) to the website operator. And after an unsuccessful transaction attempt, the website operator would still need to attempt at least one other gateway to process the transaction. Otherwise the website operator would lose the entire value of the user transaction while remaining obligated to pay the $0.30 fixed transaction fee. In a situation where a website operator charges the user a fee of 5 percent of the transaction value, a failed transaction of the type described would expend 1 percent of the $30 transaction and leave the website operator with 4 percent of the total transaction as potential profit. Thus, five failed transactions that each cost 1 percent of the transaction value would result in the elimination of any potential profit for the website operator, while the website operator must still incur further fees to even obtain the 5 percent fee charged for a successful transaction. In such a situation, assuming that each gateway charges an identical fee, it can be seen that the website operator can only tolerate up to two failed transactions (costing a combined total of $0.60) followed by a successful transaction (costing $0.75) to obtain any positive income flow from the 5 percent (i.e., $1.50) fee based on the $30 attempted transaction. Thus, it can be seen that it is desirable to eliminate as many unsuccessful transactions attempts as possible and reduce the overall number of transaction attempts to as close to one as possible, taking transaction costs into account.

In the real world, however, different gateways often charge different fees. So it may not always be desirable to reduce the number of transaction attempts to one. For example, if a first gateway charges $1.00 per transaction attempt and a second gateway charges only $0.20 for the same transaction attempt, while a third gateway charges $0.30 for the same transaction attempt, it may not always be desirable to attempt the transaction using the first gateway and incur the $1.00 charge, even if the probability of a successful transaction with that gateway is 100%. Rather, it may be desirable to attempt the transaction with either the second gateway, the third gateway, or a combination of the second and third gateway, even if the success rate with such gateways is less than 100%. If the success rate with the second gateway is 50%, the expected cost of a transaction using that gateway may be around $0.40 (i.e., two attempts at 50% success rate and $0.20 cost for each successful transaction attempt), while the expected cost of a transaction attempt with the first gateway will be $1.00 (i.e., one attempt with 100% success rate and $1.00 cost for each transaction attempt). Thus, if a website operator is attempting to maximize revenue, the website operator may need to make decisions that are not entirely weighted towards reducing the number of transaction attempts. Known systems and methods that allow website operators to process payments through payment gateways do not adequately account for the gateway fees and rates at which transactions fail.

In view of these circumstances and in attempts to increase the success rate of such transaction attempts, website operators will often integrate with multiple gateways so that various transactions may be attempted on various gateways. Sometimes such transaction attempts will be at the same cost and sometimes at various or varying cost. By integrating with multiple credit card gateway processors, it may also be possible to increase the number of types of different currencies that may be accepted in transactions on the website. And it may also be possible to increase the transaction success rate by making it possible to process different types of currency or card transactions with different gateways. For example, a transaction processed in British pounds may have a high likelihood of success with a first gateway and a low likelihood of success with a second gateway, while a transaction processed in Australian dollars may have a low likelihood of success with the first gateway and a high likelihood of success with the second gateway. And such differences in success rates may be dependent on a number of additional factors, including, for example, the identity of the bank that issued the credit card, the relationship between the gateway and the issuing bank, the ability of the gateway to accept a particular currency, the ability of the gateway to process a particular type of transaction, etc. Thus, by integrating with multiple gateways, a website operator may be able to increase the transaction success rate by switching gateways after a failed transaction.

Although such switching may be an effective way to increase the transaction success rate, it has several shortcomings. Examples of those shortcomings are listed herein. First, switching based on success or failure does not take into account the gateway fees. Thus, the selection and/or ordering of attempts to process transactions with various gateways may not be cost effective. Second, such a method of switching requires constant monitoring. Specifically, if a particular gateway starts declining transactions of certain types (e.g., cards with certain currencies, certain types of cards, cards from certain issuing banks, etc.), the problem causing the declined transactions must be detected. Then, the relevant transaction traffic to that gateway should be adjusted to take into account the declined transactions. However, known methods for switching transactions across multiple gateways do not detect or account for such transactions in a meaningful fashion. Third, known methods for switching transactions across multiple gateways do not take into account a gateway's success rate for different types of transactions. Rather, the methods rely upon switching transaction attempts to different gateways instead of attempting to account for the reason or reasons that a particular transaction failed.

Additionally, it is almost always desirable to quickly process transactions. Often, if a user is required to wait more than a few seconds, e.g., 10 or 15 seconds, while a website operator attempts to process a credit card transaction, the user will lose patience. This may result in the user cancelling the transaction or attempting to refresh, reload, or re-submit the transaction webpage, any of which may cause problems including multiple undesired transactions. Thus, traditional methods of determining transactions to attempt by using the human mind are insufficient for the types of transactions at issue. It will take a human being an excessively long time to retrieve a transaction request, submit the request to a payment gateway, receive a single result, and report the result back to the user. In fact, in the time that it may take a human being to even type a phone number or transaction details, the ten to fifteen seconds for the transaction may have elapsed, causing the user to lose patience as noted above. Thus, it is not possible to attempt transactions in the desired manner without the use of specialized computers and communication equipment.

Moreover, website operators must often process many rapid transactions. In typical circumstances, a website operator offering the ability to conduct online credit card transactions will need to process thousands, tens of thousands, or more transactions on a typical day. Thus, the use of humans to process the transactions would be excessively costly, excessively slow, or both.

For the avoidance of doubt, the above-described contextual background shall not be considered limiting on any of the below-described embodiments, as described in more detail below.

DETAILED DESCRIPTION

Figure 1:
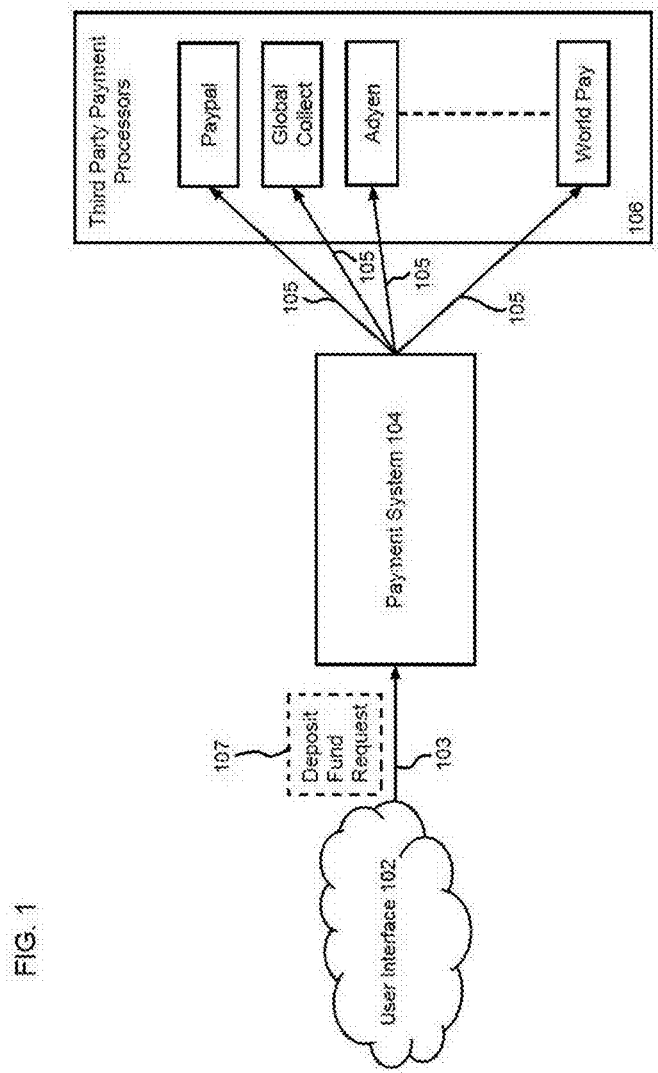
FIG. 1 illustrates an exemplary block diagram of the payment system described herein.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the various embodiments.

Systems and methods disclosed herein relate to the use of computer hardware without human intervention to process transaction requests by users of online services. Preferably, the online services will route the transaction requests to multiple payment gateway processors (which, as noted above, may be an acquiring bank) based on the encountered transaction success and failure rates that are encountered. A user can use a smart phone, computer, tablet, laptop, or other electronic device with communication capability, for example, or a proprietary device to transmit a transaction request to a server in connection with an online service. The hardware of the online service, which may be cloud-based hardware utilized by multiple services, will transmit the transaction request to a server of a payment gateway, and then either receive a transaction result or timeout. Preferably, the result will identify transaction success or failure. If the transaction fails, the result may be transmitted with further information identifying a reason for the failure. If the gateway processor does not transmit a result within a meaningful time period, the request may time out. Upon receipt of the result, the hardware of the online service updates the policy used to choose the appropriate gateway processor to which certain transaction requests may be routed. In the circumstance where a transaction is successful, no further immediate action is required. In the situation where a transaction fails, the hardware of the online service will use the policy to determine whether it is appropriate to route the transaction request to a different gateway processor or reject the transaction request. In the circumstance where a transaction times out, the transaction request may be treated as a failure and routed to another gateway processor or treated as indeterminate and rerouted to the same gateway processor for a second attempt. Upon a successful transaction or a rejected transaction, the user may be notified of the ultimate result.

The policy used to determine the manner in which to handle the transaction request uses machine learning techniques to, for example, minimize the overall expected cost of processing transaction requests by tracking the success rate of the payment processing gateways. The machine learning techniques will cause the policy to adjust routing of transaction requests based upon introduced changes to the costs or success rates of one or more payment processing gateways. In addition, the policy may be adjusted to not only minimize overall expected cost, but to weight factors such as success rate and cost in an attempt to reduce both cost and processing time. For example, in a hypothetical system, gateways A, B and C each cost $0.10 and to attempt a transaction with varying success rates and take 5 seconds per transaction attempt, while gateway D costs $0.40 with a 100% success rate and takes 5 seconds per transaction attempt. In this system, if cost minimization was the only goal, the policy would be likely to attempt each of the less expensive gateways A, B and C in some order before attempting the more expensive gateway D. However, if cost was weighted with time and a goal of returning a result within 11 seconds, the policy may be likely to attempt only one of the less expensive gateways A, B or C before attempting the more expensive, but guaranteed success of, gateway D. This strategy would guarantee a successful result within 11 seconds, whereas attempting two or more of gateways A, B and C might result in an indeterminate result after 11 seconds.

In a preferred embodiment of the inventive methods and apparatuses, an adaptive payment gateway switching system resides, either virtually or physically, between the payment module of an internet-based interactive system (such as a website, video game network, server system for multiple clients) and a credit card processing gateway. The adaptive payment gateway switching system may determine which gateway should be used to process each credit card transaction received from a user via the internet-based interactive system. This is preferable to allowing a user to specify a gateway or pre-selecting a fixed gateway that may later experience transaction processing problems. The system may also determine what step should be taken next if a transaction fails. Such steps may include choosing another gateway for a follow-on processing attempt or determining that the system should not make any further attempts to process the transaction. Over a number of transaction attempts, the system will learn the success rate distribution of different transaction types across all gateways for which processing attempts have been attempted. As the number of transaction attempts increases, the system will obtain more detailed knowledge of the success rate distribution for each type of transaction which has been attempted. For example, after 1,000 attempts to process a Visa transaction in Mexican pesos using a particular gateway, the system will have a much more detailed set of data from which to determine the success rate than it would have after only 5, 10 or 100 attempts to process such a transaction. As the system learns the success rate distribution of different transaction types for different gateways, the system may route the transaction processing attempts to the gateway or series of gateways that appears most optimal based upon the known data. This autonomous payment system may adapt to environmental changes and learn from the result obtained through each transaction attempt without requiring human interaction or intervention.

The inventive system is preferably implemented using reinforcement learning. Reinforcement learning is a machine learning technique in which the system learns by earning virtual rewards for the actions that it performs. Unlike supervised learning methods that are often presented with correct training data, reinforcement learning algorithms are rarely or never presented with training data. Rather, in reinforcement learning the learning system, often referred to as the agent, discovers the reward yielded by the actions taken within the relevant environment. The agent attempts to maximize the expected rewards. As described above, the reward or rewards may be defined or weighted in various manners.

In the inventive reinforcement learning system, the primary components of the system are agent actions ("A"), environment states ("S"), the policy ("$\pi$"), and the reward function ("R").

The policy is the mapping of the states to the actions at any given time, and may be represented as $\pi: S \rightarrow A$. That is, the policy defines a set of actions to take given a particular state. For example, a policy may state that for a transaction in U.S. dollars using a Mastercard, first attempt to process the transaction using GC. Then, if the transaction fails, attempt PayPal. Then, if that transaction fails, attempt another gateway, e.g., WP. It is preferable that when a policy is introduced, the actions taken by a policy are random or nonpreferential, and that as various transactions are attempted over time, the policy may be updated to reflect the results of the attempts. However, it should be noted that the instant invention encompasses systems and methods in which the policy has one or more mappings of states to non-random or otherwise specified actions.

The reward function provides the value that that is computed based on the result of actions in the environment. It is preferred that the reward function be computed at the end of each action. The reward function may be represented as $R: S \times A \rightarrow \mathbb{R}$, where R is a function of the state and the action and returns a real number reward ($\mathbb{R}$).

For purposes of simulating the agent actions in a manner to allow analysis of the system, one may assume that the environment in which the agent is operating is broken into successive time steps, wherein an action occurs in each time step t. In such a setting, at each time step t, the agent may receive a state s from the environment, perform an action a, and receive a numerical reward r in response to action a. It is preferable that the agent track the values of each action at each time step and attempt to maximize the expected reward outcome while exploring new actions for the possibility of better rewards. It should be understood that in real-time application of the methods taught herein, many transactions may be pending simultaneously such that the agent may be required to perform many actions before receiving the reward from the first action. Or, several agent instances may be tasked with performing actions in parallel and sharing reward information with the parallel agent instances such that all instances can learn from the experiences of all of the other instances. Thus, while the simplistic environment described herein is ideal for formulating an understanding of the systems and methods, it is necessarily simplified from a real-time system.

The inventive adaptive gateway switching model described herein comprises a payment agent and a payment processing environment. The payment agent is the mechanism tasked with learning in a manner that will increase performance of a payment system. Preferably, for each transaction at any given time, the payment agent undertakes an agent action by choosing a payment gateway through which to attempt processing a transaction. The payment gateway is chosen from the available actions in the state from which the agent undertakes the agent action. While it is preferable that the agent undertakes an action for each transaction, systems in which the agent acts on less than all transactions may still fall within the scope of the invention, as such systems will benefit from reinforcement learning, but at a slower relative pace. The payment agent notifies the payment processing environment to send a transaction request to the selected gateway based upon the appropriate agent action. The payment processing environment then sends the transaction request to the specified gateway. Upon receiving a result (or timeout) from the gateway for the transaction request, the payment processing environment computes a reward for the action based upon the result (or timeout) of the order. The payment processing environment then returns the reward and the new environment state to the agent. Based upon the new state and the reward, the payment agent then selects the next action according to the policy. In this embodiment, it is preferable that the payment processing environment be formulated as a Markov decision process so that it will fit within the standard framework of reinforcement learning.

A preferred goal of the agent is interaction with the payment processing environment through selecting a payment gateway in a manner that maximizes the accumulated reward $R_t$ at each time step t, as set forth in equation 1.

$$R_t = \Sigma_t \gamma^t r_{t+1} \quad \text{(Equation 1)}$$

In equation 1, $0 \leq \gamma \leq 1$, and $\gamma$ is the discount factor that is used to compute the present value of the future rewards. If $\gamma=0$, then the system will be considered short-sighted and only be interested in the reward for the initial attempted transaction. If $\gamma=1$, then the system will take a longer term view and be satisfied if the last transaction attempted is the transaction attempt with the best or a high reward. Thus, it is preferable to select a value of $\gamma$ wherein the preference is not initially weighted heavily towards either an initial or a late transaction attempt. It is preferable to set $\gamma$ at approximately 0.3 when the system or method is initialized. This will weight the decision in a manner that gives preference to the optimal action suggested based upon the previous state and will discount the reward as the system or method takes additional attempts before obtaining the reward. For example, a reward for a fifth attempt discounted at $0.3^5$ is given a much lower weight than a reward for a first attempt that is discounted at $0.3^1$.

With equation one providing the means of calculating the accumulated rewards $R_t$, the standard action-value function for the policy $\pi$ may be defined by equation 2:

$$Q^\pi(s,a) = \Sigma_\pi [R_t | s_t=s, a_t=a] \quad \text{(Equation 2)}$$

In equation 2, $Q^\pi(s, a)$ provides the expected value of following the policy $\pi$ after taking action ($a \in$ {all possible gateways}) in state s. Thus, it becomes appropriate to define $Q^*(s, a)$ to be the optimal action-value function and $\pi^*$ to be the optimal policy, as set forth in equation 3.

$$Q^*(s,a) = \text{argmax}_\pi Q^\pi(s,a) \quad \text{(Equation 3)}$$

$Q^*(s, a)$ thus satisfies the Bellman equation that the value of the state under the optimal policy should be equal to the expected reward of the best action, as set forth in equation 4.

$$Q^*(s,a) = E[r(s,a) + \gamma \max_{a'}(Q(s',a'))] \quad \text{(Equation 4)}$$

As set forth in equation 4, s' is the next state after applying action a, and a' is the next action. By way of example, in equation 4, a may represent the action of choosing the payment gateway GC from state s for a transaction attempt and, upon failure of GC to process a transaction, the policy may direct the agent to next attempt a transaction with WP, in which case a' would represent the action of choosing WP for the following transaction in state s'.

An approximation of Q* may be gained through use of the classic Q-learning approach, as set forth in equation 5.

$$Q_{t+1}(s_t,a_t) = Q_t(s_t,a_t) + \alpha[r(s_t,a_t) + \gamma \max_{a'}(Q_t(s_{t+1},a')) - Q_t(s_t,a_t)] \quad \text{(Equation 5)}$$

In equation 5, $\alpha$ is the learning rate, which is preferably set in the range 0 to 1. A higher $\alpha$ value results in a relatively faster recovery when a gateway fails than does a lower $\alpha$ value. Consider an example where NAB has been functioning regularly, such that certain transaction attempts are sent to NAB under appropriate conditions, and then NAB unexpectedly goes offline. After NAB goes offline, transaction attempts sent to NAB will begin resulting immediately in failed transactions or timeouts. Thus, where it may have been desirable to route such attempts to NAB in the past, it would now be desirable to route the attempts to another gateway. If a higher $\alpha$ value has been specified, the policy will recover more quickly and being directing the payment agent to direct transactions attempts to the alternative gateway more quickly. Whereas if a lower $\alpha$ value has been specified, it will take a relatively longer period of time to for the policy to recover and more attempts may be directed to NAB even after NAB goes offline. The inventive systems and methods contemplate situations in which either fast or slow recovery may be desirable. For example, if a particular gateway provides a strong benefit in terms of cost savings for many transactions, but is known to go offline for brief periods before recovering quickly, it may be desirable to set a low $\alpha$ value so that the policy will continue to direct the agent to attempt transactions with that gateway rather than resetting to a different, more expensive gateway. Likewise, if a particular gateway provides a strong benefit such that many transaction attempts are routed there, but is known to go offline for extended periods of time, it may be desirable to set a high $\alpha$ value to more quickly begin routing transaction attempts to other gateways.

Turning now to a more thorough description of the states in the preferred embodiment, for the states to possess the Markov property of independence of the future from the past, given the present, the states should summarize past transaction attempts. Therefore, it is preferable to define the state as the tuple (M, U, B, G, H) (or, as described below, (M, N, U, B, G, H)). In this tuple, M is the card type, for example, AMEX, Mastercard, Visa, etc. U represents the transaction currency, e.g., British Pounds, Euros, U.S. dollars, etc. B is the issuing bank country for the user's credit card for which a transaction is being attempted, e.g., Switzerland, Mexico, Australia, etc. G provides the result of the previously attempted gateway. G allows the policy to avoid successively attempting transactions using a gateway with which the same transaction has already been attempted. For example, if the agent attempted a transaction with Alipay that failed, it would be undesirable to attempt the transaction with Alipay again. Thus, by recording the past attempt in G, such repeat attempts can be avoided. One of ordinary skill will recognize that merely storing a single gateway for which an attempt was unsuccessful may result in a loop between two or three gateways if the state machine does not have a richer history of past attempts. Thus, it should be recognized that states may recursively look-back at all past attempts G to avoid repeating failed attempts. Additionally, it is possible to store all previously attempted gateways in G. H provides the ordered list of already attempted gateways, if any. One of skill will recognize that it is possible to combine the data stored in elements G and H into a single element. Thus, while it is preferable to store both G and H, the invention contemplates systems in which G and H are combined. Use of the identified tuple in the preferred embodiment provides a finite number of states within the system and a finite number of reward values while also taking account of the past actions and results of each state in a past sequence of states. In some embodiments, the credit card bank identification number (often the leading six digits of a credit card number) may be added, defining the state as the tuple (M, N, U, B, G, H), wherein N represents the bank identification number. Inclusion of the bank identification number may provide further useful information, as it may help predict whether a certain bank reacts in particular manners with respect to various types of transaction attempts.

In a preferred embodiment of the invention, a hash is created for each state, representing the values of M, U, B, G, and H (or M, N, U, B, G, and H). The hash may be stored in a MySQL database for later retrieval. A MySQL database may also be used to store the calculated Q values. Other suitable databases may be used.

In the inventive system, the rewards for each action may be computed. To give priority to the more cost effective gateways, the price of each action sent to the agent for execution, which may be an API call, should be incorporated into the reward function. As noted above, a gateway processor's price may vary for each transaction. The price may be based on the card type, currency type, transaction amount, and whether the transaction was successful.

Defining the cost of a transaction allows for incorporation of this pricing information into the policy defining the actions to be taken by the inventive system. Use of the actual cost of the transactions results in a complex cost function. Such a function falls within the scope of the inventions described herein. But it is preferable to use a percentage or fractional value rather than the same value times the amount of the transaction. Therefore, it is preferable to define $Cost_g(M, U, A, F)$ to represent the gateway (g) cost function. In this definition, A is the transaction amount and $F \in \{0,1\}$ represents the transaction success result. If the transaction attempt fails, $f=0$. If the transaction attempt succeeds, $f=1$.

It is possible to incorporate the $Cost_g$ into the reward function by assigning a negative reward value equal to the cost of each action sent to the agent, e.g., by an API call, for unsuccessful transaction attempts where $f=0$ and by assigning a positive, e.g., +1, reward value for each successful transaction where $f=1$. However, this approach produces negative Q values. Negative Q values are not propagated well to other states in Q-learning. So it is desirable to overcome the need to use values that would result in negative Q values.

Thus, in a preferred embodiment, the transaction amount A is removed from the $Cost_g$ to bound the function. Having done so, the reward function may be defined by equation 6.

$$r(s, a, f) = \delta(f)\left(1 - \left(\frac{Cost_{g_i(s,M,s,U,f)}}{\max_{g_i} Cost_{g_i}(s,M,s,U,f)}\right)\right) \quad \text{(Equation 6)}$$

Because cost is generally a negative factor, equation 6 seeks to reconcile cost into a positive value. This will eliminate problems with propagating negative cost values to other states. Cost is first normalized by dividing the cost of the instant action by the maximum cost over known gateways to return a fractional value of the maximum cost in the range 0 to 1. This value is then subtracted from 1 to return a number that will always be positive or zero. Finally, the penalty factor is applied.

In equation 6, $\delta(f)$ is the penalty factor for failed transactions. This penalty factor may be defined in the manner set forth in equation 7.

$$\delta(f) = \begin{cases} 1, & \text{if } f = 1 \\ 0.05, & \text{otherwise} \end{cases} \quad \text{(Equation 7)}$$

By setting the equation 7 values in this manner, it may be suggested that it is acceptable to attempt to process a transaction using up to a certain number of, e.g., up to five, inexpensive gateways that may be less reliable before turning to a more reliable and more expensive gateway. The penalty factors set forth in equation 7 may be used in a preferred embodiment of the invention. However, it is possible to adjust these factors to alter the distribution or the reward function.

As set forth in equation 6, the reward function normalizes the cost functions over the maximum cost defined in the system. It penalizes any rewards for failed transactions by applying $\delta(f)$. Thus, the reward function accomplishes the preferred result of producing all positive Q values that can be more easily propagated to other states.

Referring now to FIG. 1, a block diagram of an exemplary system in which the inventive methods and apparatuses may reside is set forth. User interface 102 is the interface, whether graphical or otherwise between a website operator's systems and a user of the website. In a common embodiment, user interface 102 includes a webpage or website that may be displayed on a web browser such as Internet Explorer, Chrome, Firefox, etc. that is resident on a user's remote user computing device. User interface 102 preferably also includes at least one web server that communicates with the remote user computing device and provides the information needed to display the webpage or website. User interface 102 may be a terminal interface, an audio interface such as an automated telephone system, or other types of interfaces through which a user may request a credit card transaction. In many instances, website operators provide multiple user interfaces simultaneously, such as both websites and automated telephone systems. User interface 102 may reside on the website operator's proprietary computer systems (such as web servers), may reside on shared computing resources (such as cloud-based computing resources), or may reside on any satisfactory computer system that provides the ability to interact with users in a manner that allows users to submit credit card transactions for processing. In a preferred embodiment, user interface 102 includes a web server that a user may communicate with from a remote user computing device via hypertext transfer protocol (http). In another preferred embodiment, user interface 102 is a software package, such as an application for a smartphone or tablet computer or an application for a computing device that is provided by the website operator, a marketplace, or other means for download to a user's computing device. The user interface 102 may be implemented, for example, using a Java applet delivered to a user's computing device. When the user interface is such a software package, it may communicate via data connection 103 using a proprietary or known communication protocol. It may be advantageous to employ a proprietary communication protocol for data security. A data connection 103 exists between user interface 102 and the website operator's payment system 104. Data connection 103 may be a direct connection, a connection routed through an internal network, a connection routed through the Internet, or any suitable connection for communicating data regarding a credit card transaction attempt between user interface 102 and payment system 104.

As indicated in FIG. 1, a request 107 may be sent on data connection 103 from user interface 102 to payment system 104. The request may be a deposit fund request, a credit transaction request, or other type of request that can be handled by payment gateways. A request may include varying amounts of information based upon the amount of information needed to process the request. A request in the preferred embodiment will include at least specification of a currency type, information that can be used to determine an issuing bank country, and an account identifier such as the account number. The request may also include additional data, for example, account holder name, account expiration date, verification information, account billing address, or other data that may be needed to process a request. In the alternative, some or all of this information may be stored in the system such that the request might include only an indication that a pre-defined transaction is authorized. After entering the payment system 104, the request 107 may be routed via one of data connections 105 to one of third party payment processors (or gateways or acquiring banks) 106, according to the selection and routing policy set forth herein. Data connections 105 may be direct connections, connections routed through an internal network, connections routed through the Internet, or any suitable connection for communicating data regarding a credit card transaction attempt between payment system 104 and third party payment processors 106. Data connections 103 and 105 may be physical connections allowing the flow of data in some instances, but may also be virtual connections in which different data packets are routed on different physical paths before ultimately reaching the same destination.

After transmission of a request 107 along data connection 105 to a processor 106, payment system 104 will wait for a response from the processor 106. In some embodiments, payment system 104 will only wait for a response from a processor 106 for a limited amount of time before allowing the request to "time out." After a request has timed out, the request may be routed along another data connection 105 to another processor 106. However, it is important to determine whether a request timed out prior to the processor 106 beginning to attempt to process the request or after the processor 106 began attempting to process the request. The earlier situation may result where the processor 106 does not respond to transmissions from payment system 104 or, for example, where the processor 106 does not complete the handshaking process for establishing a connection over which data may be sent. The latter situation may occur where the processor 106 accepts and acknowledges the transaction attempt, but does not ever send a confirmation that the transaction was completed. In the latter situation, it may not be appropriate to re-route the transaction attempt along another data connection 105 to another processor 106, because this might result in double charging the user's credit card. Thus, in such situations, the timeout protocol must allow for a longer response time or application of procedures or rules designed to handle the lack of a confirmation. However, in the earlier situation, in which the transaction attempt by the processor 106 had not yet begun, it may be appropriate to report the attempt as a failed transaction attempt, update the reward function and policy, and request the identity of another processor 106 to which the transaction attempt may be routed. The timeout protocol and procedure can be adapted to allow different time thresholds in different circumstances or can be eliminated completely while remaining within the scope of the disclosed embodiments.

In a typical circumstance, processor 106 will accept, process, and report the result of a transaction attempt rather than timing out. In this circumstance, processor 106 reports the result of the transaction using a data connection 105 to payment system 104. The transaction generally has one of two results: approve or decline. When a transaction is approved, the payment system 104 preferably reports the result to the user by transmitting an approval report on data connection 103 to user interface 102, thereby notifying the user that the transaction was approved. When a transaction is declined, the payment system 104 will determine whether to make another transaction attempt and, if so, the processor 106 to which the attempt should be directed. If the payment system 104 determines that no further transaction attempts should be made, the payment system 104 will preferably report the result to the user by transmitting an appropriate notification on data connection 103 to user interface 102, thereby notifying the user of the transaction result. If, however, the payment system 104 determines that a further transaction attempt should be made, the payment system 104 will use the methods described herein to determine to which processor 106 the transaction attempt should be sent. The transaction attempt will then be sent by payment system 104 on data connection 105 to a processor 106.

It should be noted that transmissions along data connections 105 to and from processors 106 must be encoded in the appropriate processor's 106 gateway payment protocol for transmission and decoded upon receipt. Such encoding and decoding cannot be reliably performed by humans in the time in which a transaction must be processed, and must instead be performed by a computing device. For example, the system may be required to handle over 1,000 transactions in a 24-hour period, 8-hour period, or even a 4-hour period. And the amount of time that a human user is willing to wait for a credit card transaction to be completed on a website is usually much lower than the amount of time that it is expected to take a human to encode and decode data in a single gateway payment protocol, let alone multiple gateway payment protocols where early transaction attempts are denied. Moreover, the known gateways have not all adopted a common gateway payment protocol. Thus, whenever the payment system 104 determines that data should be routed to and from a different processor 106, the data must be encoded and decoded using that processor's specific gateway payment protocol. It is not expected that a human could encode and decode data in a manner that will allow the invention to operate meaningfully.

Figure 2:
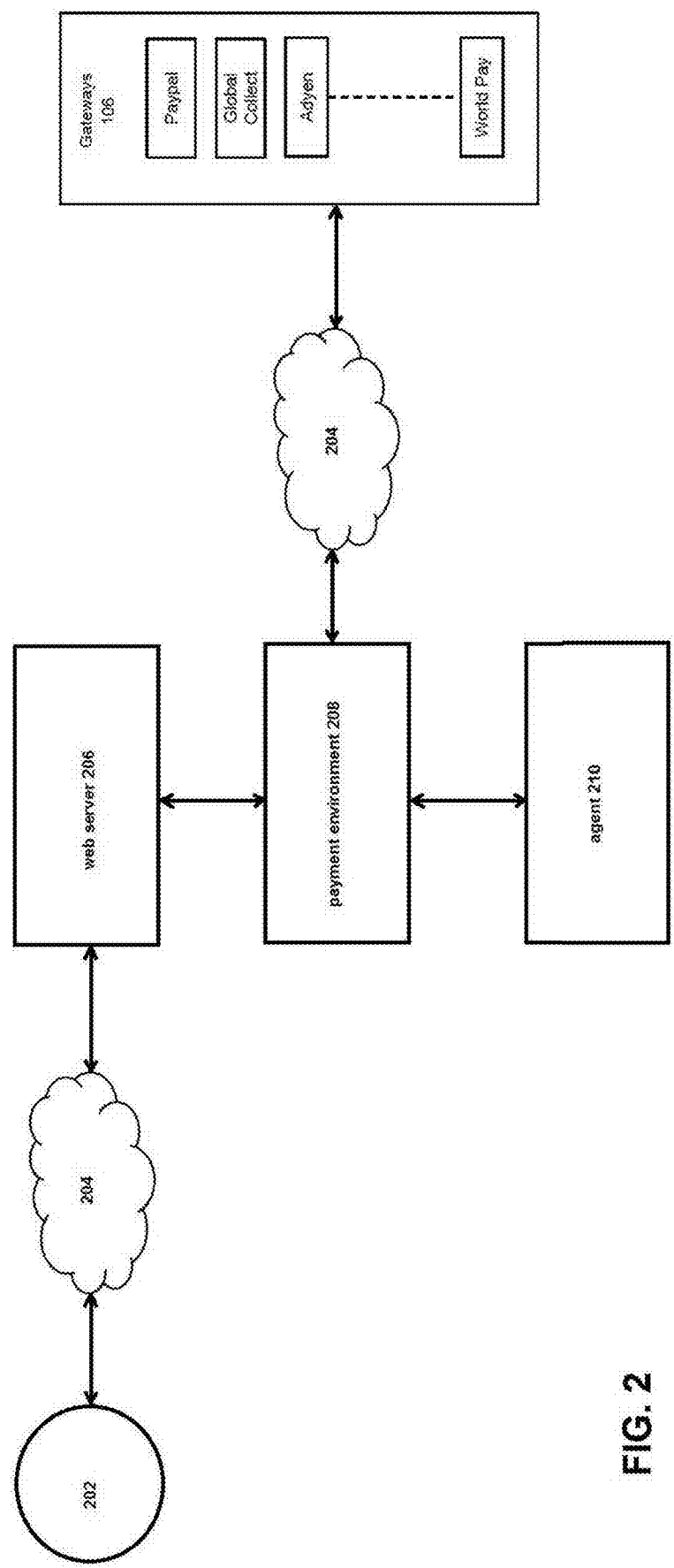
FIG. 2 illustrates an exemplary block diagram of the payment system described herein.

Referring now to FIG. 2, a block diagram of another embodiment of an exemplary system in which the inventive methods and apparatuses may reside is set forth. It is anticipated that at least web server 206, payment environment 208 and agent 210 are within the control of the website operator, although one or more of such systems may be operated by another entity. User interface 202 is the interface between a website operator's systems and a user of the website. User interface 202 may have the same properties indicated with respect to user interface 102. In the embodiment of FIG. 2, the Internet 204 is indicated as a cloud appearing between user interface 202 and web server 206. Additionally, the Internet 204 is indicated as a cloud appearing between Gateways 106 and payment environment 208. The Internet 204 is illustrated in this manner to indicate that data may be routed through the Internet using known Internet protocols which may require routing of data along various pathways and through various servers, nodes, routers, and other Internet features. The specific pathway of the data is not critical, as long as the data is routed between user interface 202 and web server 206 in one instance and between payment environment 208 and Gateways 106 in the other instance. Similar to the illustration in FIG. 1, a request 107 may be sent through the Internet 204 from user interface 102 to web server 206. Web server 206 may then transmit appropriate information from the request 107 to payment environment 208. Prior to transmission from web server 206 to payment environment 208, it may be necessary for web server 206 to process the request 107 to format the information using the proper communication protocol that will be accepted by payment environment 208. In this embodiment, upon receipt of request 107 from web server 206, payment environment 208 will process the request 107 in the following manner.

Payment environment 208 will provide the state of the system to agent 210. Agent 210 will choose a Gateway (or processor) 106 for a processing attempt according to the policy described herein. Agent 210 will then notify the payment environment 208 to send a transaction request to the selected Gateway 106 based upon the results of applying the policy to the request 107. Payment environment 208 will then send appropriate information from request 107 and any other information needed to form a transaction request according to the relevant protocol to the specified Gateway 106. As indicated in FIG. 2, exemplary gateways 106 include PayPal, Global Collect, Adyen, and World Pay among others. The Gateway (or processor) 106 illustrated in FIG. 2 interacts with payment environment 208 in the same fashion as is described with respect to the interaction between processors 106 and payment system 104 in FIG. 1, with the primary difference being that the data connection 105 is replaced by a connection through the Internet 204 and the use of Internet transmission and communication protocols. (However, data connection 105 may also be a connection through the Internet.) Upon receiving a result (or timeout) from the specified Gateway 106 for the transaction request, the payment environment 208 computes a reward for the action based upon the result (or timeout) of the transaction request. The payment environment 208 then returns the reward and the new payment environment state to the agent 210. In the alternative, payment environment 208 may report the result (or timeout) of the transaction request and the payment environment state to agent 210, and agent 210 may itself compute the reward for the action. Based upon the new state and the reward, the payment agent 210 then selects the next action according to the policy described herein. For example, if the transaction request was unsuccessful or timed out, the payment agent 210 may direct the payment environment 208 to re-route the transaction request to a different Gateway 106 (or even to the same Gateway 106). Or, in such a circumstance, the agent 210 may direct the payment environment to report that the transaction attempt was unsuccessful. If, for example, the transaction request was successful, the agent 210 may direct the payment environment 208 to report that the transaction was successful. The payment environment 208 reports successful and unsuccessful transaction results to the web server 206 after converting the transaction results to an appropriate communication protocol that the web server 206 will understand. Upon receipt of a transaction result from payment environment 208, web server 206 may transmit the transaction result via Internet 204 to user interface 202 using hypertext transfer protocol or other appropriate communication protocols. In the alternative, if immediate reporting of transaction results to the user interface 202 is not needed, the transaction result may be stored in an account of the user that is maintained by the website operator or another entity, may be transmitted via email or text message, or may be otherwise communicated to the user that made the transaction request, to the beneficiary of the transaction request, or to other individuals to whom the website operator desires to transmit the result of the transaction request.

It will be understood by one of ordinary skill in the art that web server 206, payment environment 208 and agent 210 may be implemented as software modules on a single computing device, maybe be implemented on more than one computing device in a single location, or may be implemented on more than one computing device in multiple locations connected by appropriate data connections. In such instances, the data connections between one or more of these elements may be implemented using direct connections, connections through Internet communication, or other appropriate connections.

Figure 3:
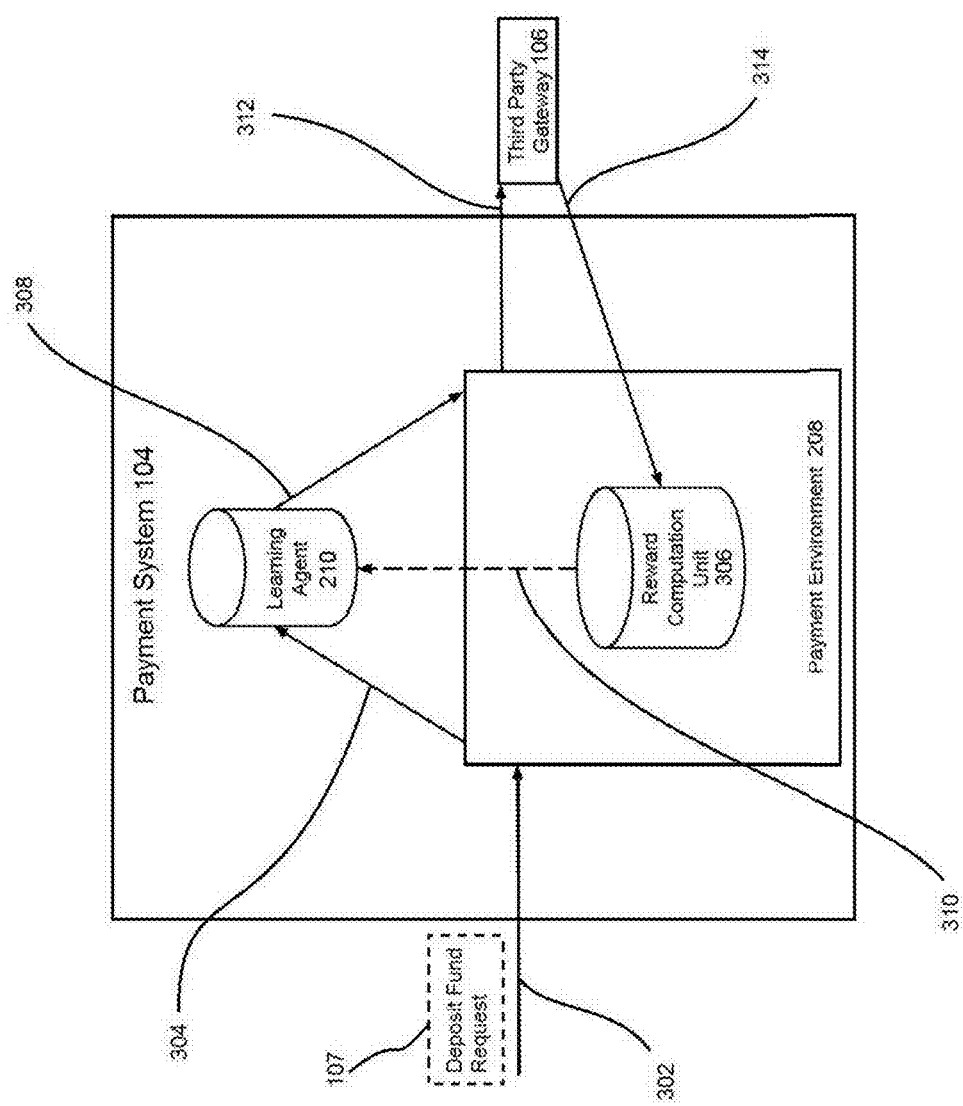
FIG. 3 illustrates an exemplary block diagram of certain elements of the payment system described herein.

Referring now to FIG. 3, an exemplary block diagram of certain elements of the payment system described herein is set forth. As illustrated, a deposit fund request 107 may be received by payment system 104 via input 302. Input 302 may be any input system or method that is suitable for conveying the deposit fund request 107 to payment system 104. Deposit fund request 107 may be received by payment system 104 from a server, such as web server 206, or from other transmission devices capable of transmitting data conforming to a communication protocol used by payment system 104. Upon receipt by payment system 104, the deposit fund request 107 is parsed by payment environment 208.

Upon parsing deposit fund request 107, payment environment 208 transmits the current state of the system to agent 210 (also called learning agent 210) as denoted by transmission 304. Transmission 304 should include at least the data M, U, and B, as previously defined with respect to state tuple (M, U, B, G, H) or (M, N, U, B, G, H). It is assumed that agent 210 is already in possession of the data G and H. However, such data may be transmitted if desired or if it is not known to agent 210. Agent 210 processes transmission 304 according to the system policy described herein, to identify a third party gateway 106 to which a transaction request should be sent.

Agent 210 then transmits the third party gateway identification via transmission 308 to payment environment 208. Upon receipt of the gateway identification, payment environment 208 transmits a transaction request 312 to the identified third party gateway 106.

Upon receipt of the transaction request 312, the third party gateway 106 is expected to attempt to process the requested transaction. The response (or lack of response) from third party gateway 106 is received by payment environment 208 via input 314. If the third party gateway 106 responds, it is expected that the response will indicate at least whether the requested transaction succeeded or failed. If the third party gateway 106 takes too long to respond, the transaction request will time out; in this situation, payment environment 208 will preferably treat the time out as a failed transaction.

Upon receipt of input 314, the reward computation unit 306 will preferably compute the reward for the transaction attempt using a reward function, preferably the reward function described in equation 6 or a similar function. Payment environment 208 then reports the reward computed by reward computation unit 306 to agent 210 via input 310. Agent 210 will update the policy in response to the reward received via input 310.

If the attempted transaction was unsuccessful due either to transaction failure or a time out, payment environment will again transmit the relevant portions of the current state (e.g., M, U and B) via input 304 to agent 210, so that the process of identifying a gateway and attempting to process the transaction may be repeated where appropriate. It is noted that in certain circumstances, as discussed in the examples above, agent 210 may determine, based on the state, that no further attempts to process the transaction should be made. In such circumstances, Agent 210 may send an instruction via transmission 308 that directs the payment environment 208 to report to the requester that deposit fund request 107 was unsuccessful. This process may be represented by the following pseudo-code:

```
state = Initial State
while state is Not TerminalState {
    action = agent.getAction(state)
    result = gateways.doAction(action)
    nextState = getNextState(action, result)
    reward = getReward(state, action, result)
    agent.updateQValue(state, action, nextState, reward)
    state = nextState
}
```

If the attempted transaction was successful, payment environment 208 will report to the requester that deposit fund request 107 was successful.

Figure 4:
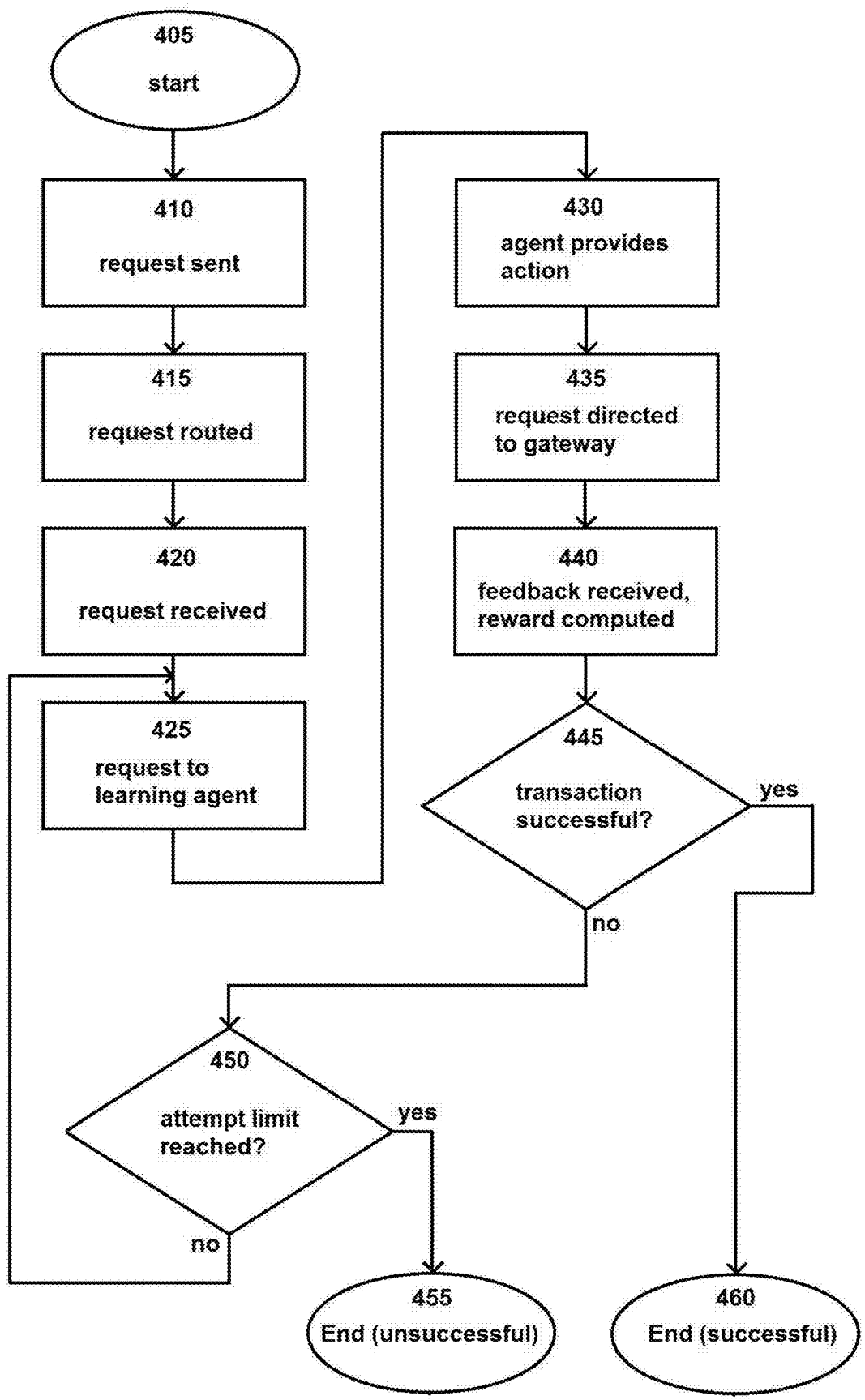
FIG. 4 illustrates an exemplary flow diagram showing possible steps of the methods described herein.

Referring now to FIG. 4, an example flow diagram for implementing and using the inventive method is provided. The depicted steps illustrate events that may be included in the inventive method or may be performed before or after the inventive method.

The method may start at step 405 when a user engages with the user interface that allows for processing of financial transactions. For example, this may be a user interface of a website operator such as user interface 102 or 202. The user interface engaged in step 405 may allow the user to manually or automatically enter data related to a desired transaction.

In step 410, the user transmits a request to process a transaction via the user interface. The request may be transmitted using a variety of network connections, including a connection via a cellular transmission network that is routed into the internet or a private network prior to reaching the server that will receive the request. It is preferably, however, that the request be routed through the internet to a web server 206 of a website operator. The request transmission that occurs in step 410 preferably includes at least information sufficient to identify an account, a transaction amount, a currency, and a banking institution with which the account is located. However, more or less information may be transmitted. For example, if the user has already established an account and stored such information with the transaction processor, it may not be necessary to transmit some or all of the identified information. A user could, for example, provide all of the user's financial account information to the transaction processor, including a preferred transaction amount, such that the user need only transmit enough information to give permission to process the transaction using account information already stored in a database or memory store of the transaction processor.

Upon receipt of the request sent in step 410, the method routes the request to a payment system in step 415. The payment system may be, for example, payment system 104 or payment environment 208. The request may be routed to the payment system by a web server receiving the request or another computing system that receives the request in alternative embodiments of the invention.

In step 420, the payment system receives the transaction request in the payment environment, which may be payment environment 208. Thus, it can be seen that in certain embodiments, payment environment 208 may be a stand-alone system that handles both steps 415 and 420 or an integrated portion of payment system 104.

In step 425, the payment environment routes relevant information from the payment request to the learning agent 210. As set forth above, this may include the relevant information from the tuple (M, U, B, G, H) or (M, N, U, B, G, H). The payment environment may be required to retrieve stored portions of the relevant information from a database or memory store prior to routing the information to the agent 210. For example, if the user has established an account in which the user can periodically authorize transactions to refresh an account balance, upon receiving the transaction request, the payment environment may be required to retrieve essentially all information related to the transaction, including even a pre-defined transaction amount, from a database prior to having sufficient information to route a meaningful request to the agent 210.

In step 430, upon receipt of the request information from payment environment 208, agent 210 will determine an action based upon the policy, such as the policy defined above. The action preferably includes either an identification of a gateway 106 to which the transaction request should be routed or an indication that no further transaction requests should be attempted. This action is provided to the payment environment 208.

In step 435, if the action indicates that no further action should be taken, the process may skip to step 455. However, it is preferable that in step 435, the action indicate that a transaction attempt should be routed to a gateway 106. When the action received from step 430 indicates that a transaction attempt should be routed to a gateway 106, the payment environment 208 transmits the relevant information needed for a transaction request to the identified gateway 106. The identified gateway will preferably attempt to process the transaction. In some instances, the identified gateway may be offline and the attempt to complete the transaction may not be completed. Or, the identified gateway may not return a response in a desired time period.

In step 440, payment environment receives feedback from the identified gateway 106 that attempted to process the transaction. This feedback may take multiple forms. The gateway 106 may return feedback indicating that the transaction was successful. The gateway 106 may return feedback indicating that the transaction was unsuccessful. The gateway 106 may fail to respond to the request for transaction by failing to establish a handshake or other protocol-based indication that communication was successful, in which case the payment environment 208 will preferably treat the non-response as an indication that the transaction was unsuccessful. In another instance, the gateway 106 may establish communications with the payment environment 208, but fail to respond with any indication of transaction outcome within an appropriate time period (which may be a predetermined time period). In such an instance, the payment environment 208 may treat the transaction as a failed transaction.

Upon receipt of the feedback in step 440, the payment environment computes the reward using the reward function. The reward and result is transmitted to the learning agent 210. Upon receipt of the reward and result, the learning agent 210 updates the policy's state.

After receipt of the feedback in step 440, in step 445 the system determines whether the transaction was successful. If the transaction was successful, the process proceeds to a successful end in step 460. Upon entry into step 460, it may be desirable to notify the user of the completed transaction. Where this is desirable, the payment environment initiates the steps necessary to notify the user that the transaction was completed successfully. If the transaction was unsuccessful for any reason, the process proceeds instead to step 450.

In step 450, the system determines whether a limit on the number of attempts for a transaction has been reached. Such a limit may be based on the amount of time that has transpired since the transaction request was received from the user, the number of attempts to process the transaction, the cumulative amount of fees incurred by the transaction attempts, the cumulative amount of fees incurred in relation to the amount of the transaction, or other desirable criteria for determining whether further transactions should be attempted. The limit may be predetermined or determined dynamically based upon the actions dictated by the agent 210 or feedback received from one or more gateways 106. If a limit on the number of transaction attempts has been reached, the process proceeds to an unsuccessful end in step 455. If a limit on the number of transaction attempts has not been reached, the process returns to step 425 and requests a new action from the agent 210.

As noted, FIG. 4 illustrates a method and/or flow diagram in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 5:
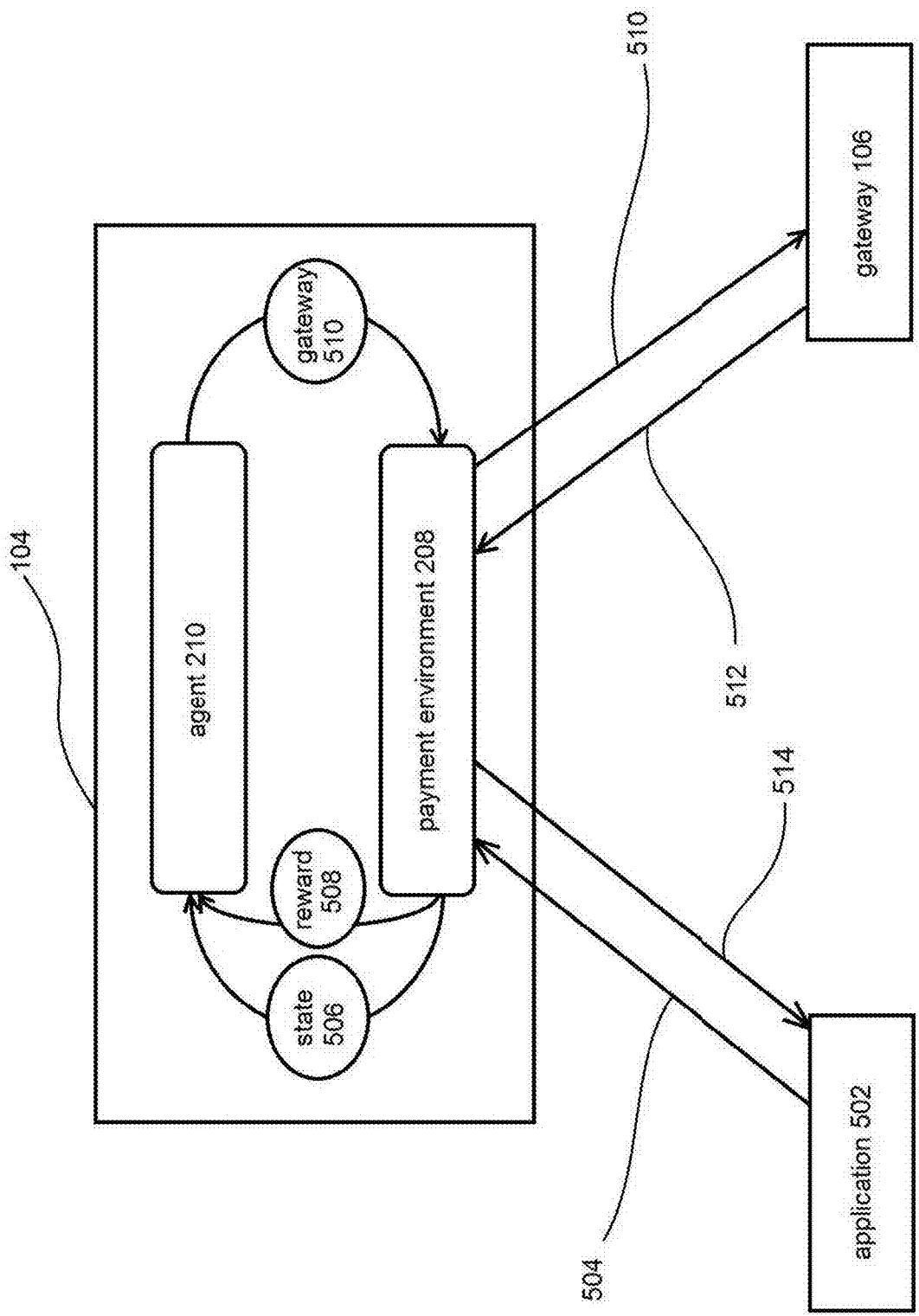
FIG. 5 illustrates an exemplary block diagram of certain elements of the payment system described herein.

Referring now to FIG. 5, an exemplary block diagram of certain elements of the payment system described herein is set forth as a quasi-finite state machine. As illustrated, the process of attempting a transaction may begin in application 502. The transaction request is transmitted via transition 504, causing control of the process to transition to payment environment 208 in payment system 104. Payment environment 208 transmits the state via transition 506 to agent 210, causing control of the process to transition to agent 210. Despite the shift in control, the information relevant to the transaction request may stay with payment environment 208. Agent 210 applies the policy to identify a gateway 106 to which the transaction attempt should be transmitted. The identified gateway is transmitted via transition 510 to payment environment 208, causing control of the process to transition to payment environment 208.

Payment environment 208 then transmits the information needed for a transaction request along transition 510 to the identified gateway 106, causing control of the process to nominally transition to that gateway 106. However, as described herein, the lack of a timely response from gateway 106 may result in a "time out" condition in which control of a type is retained by payment environment 208 despite the transition to gateway 106. Gateway 106 is expected to attempt to process the requested transaction. Upon completion of the attempt to process the transaction, gateway 106 reports the result of the transaction as a success or as a failure along transition 512 to payment environment 208, causing control of the process to transition to payment environment 208. In the alternative, if gateway 106 does not report the result in a timely manner, payment environment 208 will retake control of the process and treat the failure to respond as a failed transaction attempt. This control mechanism is preferable to avoid potentially leaving control of the process in a state that is external to payment system 104.

Upon receipt of the result along transition 512 or retaking control due to a time out condition, payment environment 208 computes the reward function for the transaction attempt and passes the reward to agent 210 along transition 508. If the transaction attempt failed, payment environment 208 simultaneously passes the state along transition 506 to agent 210. Upon receipt of the reward, agent 210 updates the policy based upon the received reward. If transaction failed, agent 210 applies the updated policy to either (a) identifies a gateway 106 to which another attempt at the transaction should be transmitted, or (b) determines that no further attempts to complete the transaction should be made. This identified gateway 106 or determination is transmitted to payment environment 208 via transition 510. At the end of the process, it is preferable to provide feedback and a return of control from payment environment 208 to application 502 via transition 514.

Figure 6:
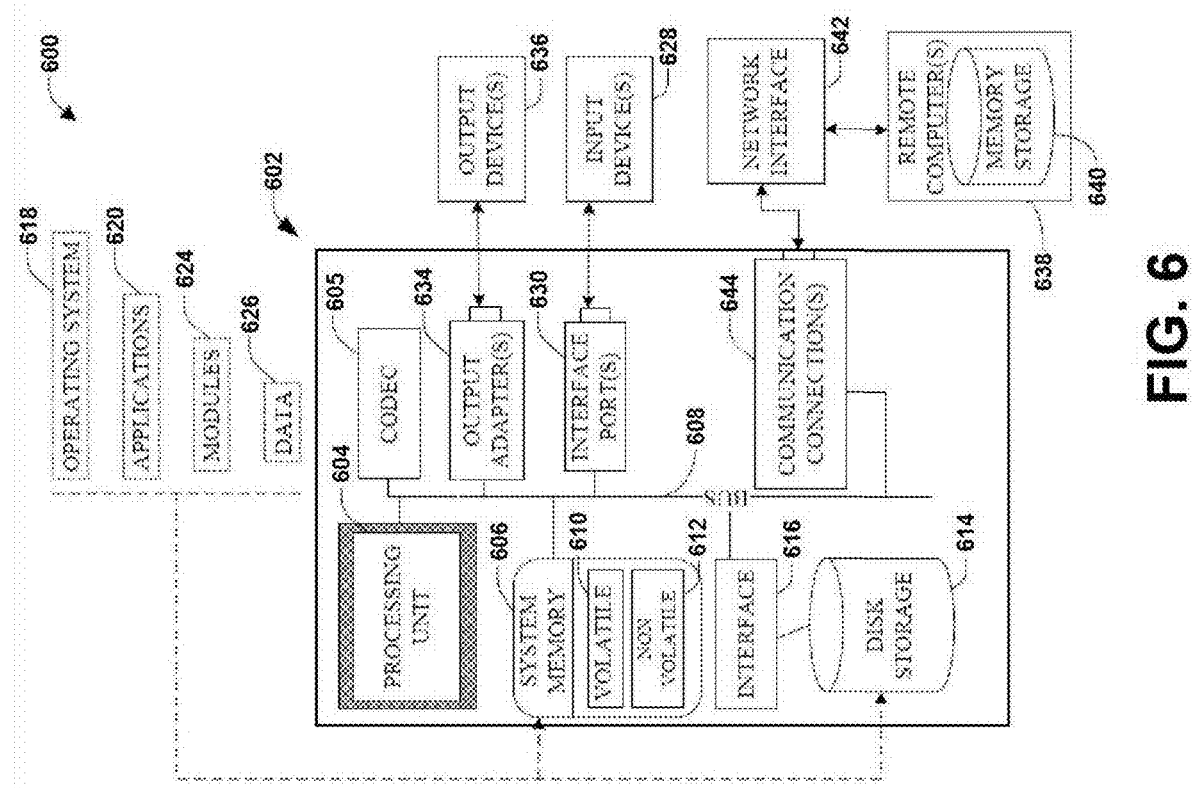
FIG. 6 illustrates an example block diagram of a computer operable to execute the disclosed methods.

With reference to FIG. 6, a suitable environment 600 for implementing various aspects of the claimed subject matter includes a computer 602. The computer 602 includes a processing unit 604, a system memory 606, a codec 605, and a system bus 608. The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 606 includes volatile memory 610 and non-volatile memory 612. The basic input/output system (BIOS), containing the basic routines to transfer information between elements within the computer 602, such as during start-up, is stored in non-volatile memory 612. By way of illustration, and not limitation, non-volatile memory 612 can include read only memory (ROM), programmable ROM (PROM), electrically programmable ROM (EPROM), electrically erasable programmable ROM (EEPROM), or flash memory. Volatile memory 610 includes random access memory (RAM), which acts as external cache memory. According to present aspects, the volatile memory may store the write operation retry logic (not shown in FIG. 6) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 602 may also include removable/non-removable, volatile/non-volatile computer storage media. FIG. 6 illustrates, for example, a disk storage 614. Disk storage 614 includes, but is not limited to, devices like a magnetic disk drive, solid state disk (SSD) floppy disk drive, tape drive, Jaz drive, Zip drive, LS-100 drive, flash memory card, or memory stick. In addition, disk storage 614 can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), DVD-RW, or Blu Ray disc. To facilitate connection of the disk storage devices 614 to the system bus 608, a removable or non-removable interface is typically used, such as interface 616.

It is to be appreciated that FIG. 6 describes software that acts as an intermediary between users and the basic computer resources described in the suitable operating environment 600. Such software includes an operating system 618. Operating system 618, which can be stored on disk storage 614, acts to control and allocate resources of the computer system 602. Applications 620 take advantage of the management of resources by operating system 618 through program modules 624, and program data 626, such as the boot/shutdown transaction table and the like, stored either in system memory 606 or on disk storage 614. It is to be appreciated that the claimed subject matter can be implemented with various operating systems or combinations of operating systems.

A user enters commands or information into the computer 602 through input device(s) 628. Input devices 628 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 604 through the system bus 608 via interface port(s) 630. Interface port(s) 630 include, for example, a serial port, a parallel port, a game port, and a universal serial bus (USB). Output device(s) 636 use some of the same type of ports as input device(s) 628. Thus, for example, a USB port may be used to provide input to computer 602, and to output information from computer 602 to an output device 636. Output adapter 634 is provided to illustrate that there are some output devices 636 like monitors, speakers, and printers, among other output devices 636, which require special adapters. The output adapters 634 include, by way of illustration and not limitation, video and sound cards that provide a means of connection between the output device 636 and the system bus 608. It should be noted that other devices and/or systems of devices provide both input and output capabilities such as remote computer(s) 638.

Computer 602 can operate in a networked environment using logical connections to one or more remote computers, such as remote computer(s) 638. The remote computer(s) 638 can be a personal computer, a server, a client, a processing center, a cloud computing center, a certificate authority, a router, a network PC, a workstation, a microprocessor based appliance, a peer device, a smart phone, a tablet, or other network node, and typically includes many of the elements described relative to computer 602. For purposes of brevity, only a memory storage device 640 is illustrated with remote computer(s) 638. Remote computer(s) 638 is logically connected to computer 602 through a network interface 642 and then connected via communication connection(s) 644. Network interface 642 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 644 refers to the hardware/software employed to connect the network interface 642 to the bus 608. While communication connection 644 is shown for illustrative clarity inside computer 602, it can also be external to computer 602. The hardware/software necessary for connection to the network interface 642 includes, for exemplary purposes only, internal and external technologies such as, modems including regular telephone grade modems, cable modems and DSL modems, ISDN adapters, and wired and wireless Ethernet cards, hubs, and routers.

Figure 7:
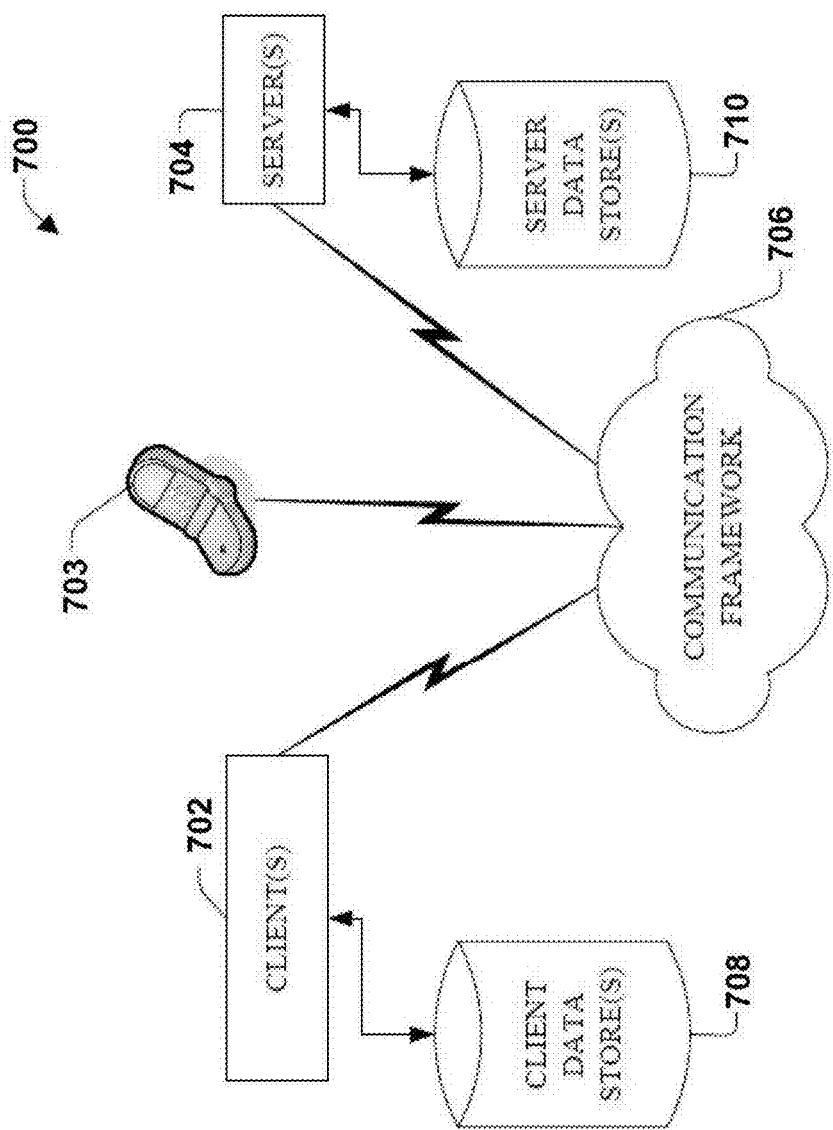
FIG. 7 illustrates an example schematic block diagram for a computing environment in accordance with the subject specification.

Referring now to FIG. 7, there is illustrated a schematic block diagram of a computing environment 700 in accordance with the subject specification. The system 700 includes one or more client(s) 702, which can include an application or a system that accesses a service on the server 704. The client(s) 702 can be hardware and/or software (e.g., threads, processes, computing devices). The client(s) 702 can house cookie(s) and/or associated contextual information by employing the specification, for example.

The system 700 also includes one or more server(s) 704. The server(s) 704 can also be hardware or hardware in combination with software (e.g., threads, processes, computing devices). One possible communication between a client 702 and a server 704 can be in the form of a data packet adapted to be transmitted between two or more computer processes where the data packet contains, for example, a certificate. The data packet can include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

The illustrated aspects of the disclosure may also be practiced in distributed computing environments where certain tasks are performed by remote processing devices that are linked through a communications network. In a distributed computing environment, program modules can be located in both local and remote memory storage devices.

The processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject embodiments are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the various embodiments includes a system as well as a computer-readable storage medium having computer-executable instructions for performing the acts and/or events of the various methods of the claimed subject matter.

What is claimed is:

1. A method, comprising:
   receiving, by a web server, a transaction request associated with a transaction from a remote user computing device via hypertext transfer protocol, wherein the transaction request includes a specification of a currency, an amount, and account information, and wherein the account information includes at least a card type, an issuing bank country, and an account identifier; and
   performing a group of operations within a defined time period without human intervention, wherein the group of operations comprises:
      storing the currency, the amount, and the account information in a physical machine memory;
      sending, to a first payment processing gateway of a first remote payment processing gateway computing device, a first gateway processing request based on the transaction request via a first gateway payment protocol,
         wherein the first gateway processing request includes specification of the currency, the amount, and at least a portion of the account information including the account identifier,
         wherein the first payment processing gateway is selected from a plurality of payment processing gateways based upon a policy, and an identification of the first payment processing gateway and a network address of the first remote payment processing gateway computing device is retrieved from a first memory device,
         wherein the identification of the first payment processing gateway is based on the policy,
         wherein the policy defines a payment processing gateway of the plurality of payment processing gateways to select based on at least the specification of the currency and another portion of the account information that includes at least the card type and the issuing bank country;
      receiving, by a payment server, a first result of the first gateway processing request from the first remote payment processing gateway computing device via the first gateway payment protocol; and
      in response to receiving the first result:
         updating, by the payment server, the policy, based on the first result, to generate a first updated policy, wherein updating the policy comprises determining a first reward function and a first real number reward based on the first result, wherein the first reward function is determined as a function of a normalized cost associated with the transaction and a penalty factor associated with failed transactions,
            wherein the normalized cost is determined as a function of a cost associated with processing the transaction request using the first payment processing gateway and a defined cost associated with respective processing of the transaction request using respective payment processing gateways of the plurality of payment processing gateways, and
            wherein to facilitate the determining of the first reward function and the first real number reward based on the first result, the payment server is trained, using machine learning, to determine modifications to the policy to update the policy to adjust routing of respective transaction requests, comprising the transaction request, to the respective payment processing gateways in order to mitigate an amount of resources, comprising computer processing resources, utilized to process transactions, comprising the transaction, and to mitigate an overall cost of the processing of the transactions;
         storing the first updated policy, comprising the first reward function and the first real number reward, in a memory device, which is the first memory device or a second memory device; and
         if the first result indicates that the first payment processing gateway was unable to successfully process the first gateway processing request, sending, to a second payment processing gateway of a second remote payment processing gateway computing device, a second gateway processing request based on the transaction request via a second gateway payment protocol of the second payment processing gateway,
            wherein the second gateway processing request includes specification of the currency, the amount, and at least the portion of the account information including the account identifier,
            wherein the second payment processing gateway is selected from the plurality of payment processing gateways based on the first updated policy, and an identification of the second payment processing gateway and a second network address of the second remote payment processing gateway computing device is retrieved from the first memory device, and wherein the identification of the second payment processing gateway is based on the first updated policy.

2. The method of claim 1, further comprising:

receiving, by the payment server, a second result of the second gateway processing request from the second payment processing gateway via the gateway payment protocol of the second payment processing gateway;

in response to receiving the second result of the second request:

updating the first updated policy, based on the second result of the second request, to generate a second updated policy, wherein the updating of the second updated policy includes determining a second reward function and a second real number reward based on the second result of the second request;

storing the second updated policy in the memory device; and if it is determined that the second result of the second request indicates that the second payment processing gateway is unable to successfully process the second gateway processing request, performing a second group of operations to attempt to process the transaction request via one or more successive gateway processing requests until a termination condition is determined to be satisfied, wherein the termination condition is selected from a group of conditions consisting of: a result of a gateway processing request indicating a successful performance of the transaction request, at least one gateway processing request has been sent to each of the plurality of payment processing gateways, and an applicable updated policy indicates that no further gateway processing requests are to be sent, and wherein the second group of operations comprise:

sending, to another remote payment processing gateway computing device, another gateway processing request based on the transaction request via another gateway payment protocol, wherein the other gateway processing request includes specification of the currency, the amount, and at least the portion of the account information including the account identifier, wherein the other payment processing gateway is selected from the plurality of payment processing gateways based on the applicable updated policy, and an identification of the other payment processing gateway is retrieved from the first memory device, wherein the identification of the other payment processing gateway is based on the applicable updated policy, and wherein the applicable updated policy defines the other processing gateway to select based on at least the specification of the currency and the other portion of the account information that includes at least the card type and the issuing bank country;

receiving, by the payment server, another result of the other gateway processing request from the other payment processing gateway via the other gateway payment protocol; and in response to receiving the other result:

updating the applicable updated policy, based on the other result, to generate another updated policy, wherein the updating of applicable updated the policy includes determining another reward function and another real number reward based on the other result; and storing the other updated policy in the memory device.

3. The method of claim 1, further comprising:
performing the operations of claim 1 for at least 1000 transaction requests within a 24 hour period.

4. The method of claim 2, further comprising:
performing the operations of claim 2 for at least 1000 transaction requests within a 24 hour period.

5. The method of claim 1, further comprising:
performing the operations of claim 1 for at least 1000 transaction requests within an 8 hour period.

6. The method of claim 2, further comprising:
performing the operations of claim 2 for at least 1000 transaction requests within an 8 hour period.

7. The method of claim 2, wherein the transaction request is a request to make a payment using a credit card.

8. The method of claim 1, wherein the first result is selected from a set of results consisting of: a success that indicates the transaction request was processed successfully; a failure that indicates the transaction request failed to be processed successfully;

and an inability to complete the gateway processing request due to expiration of a predetermined time out period for the gateway processing request.

9. The method of claim 2, wherein the operations of claim 2 that are to be performed after receiving the second result of the second request are performed within a 30 second period without human intervention.

10. The method of claim 2, wherein the policy provides a mapping of a plurality of states to a plurality of potential actions, and each state of the plurality of states is mapped to one action of the plurality of potential actions;

wherein the plurality of potential actions comprises identifications of payment processing gateways to which processing requests are able to be directed; and wherein each state comprises a tuple including a card type, a transaction currency, a country of a card issuer, a result of the previous processing request, and an ordered list of zero or more payment processing gateways to which previous processing requests have been sent for the relevant card type, currency, and card issuer country.

11. A method for processing a transaction request, comprising:

providing a user interface application to a user for installation on a computing device of the user, wherein the application includes functionality for creating transaction requests;

receiving, by a server, the transaction request associated with a transaction sent over a communication network from the computing device, the server comprising a microprocessor and a memory that stores information related to the transaction request;

retrieving data related to the transaction request, including a specified currency, a transaction amount, and an account identifier;

providing the data related to the transaction request to a learning agent;

receiving, from the learning agent, an identification of a first payment processing gateway that is identified from a set of payment processing gateways, wherein the identification of the first payment processing gateway by the learning agent is based on a policy and analysis of the data related to the transaction request;

transmitting, to the first payment processing gateway over the communication network, a first request to complete the transaction based on at least a portion of the data related to the transaction request;

receiving, from the first payment processing gateway, a first result of the first request to complete the transaction;

providing the first result to the learning agent, comprising a processor, for use in calculating a first reward function, based on the first result, and updating the policy, based on the first result and the first reward function, to generate a first updated policy, wherein the first reward function is determined based on a normalized cost associated with the transaction and a penalty factor associated with failed transactions, wherein the normalized cost is determined based on a cost associated with processing the transaction request utilizing the first payment processing gateway and a defined cost associated with respective processing of the transaction request utilizing respective payment processing gateways of the set of payment processing gateways, and wherein to facilitate the calculating of the first reward function, based on the first result, the learning agent is trained to determine modifications to the policy to update the policy to adjust routing of respective transaction requests, comprising the transaction request, to the respective payment processing gateways to reduce an amount of resources, comprising processing resources, utilized to process transactions, comprising the transaction, and to reduce an overall cost of the processing of the transactions; and transmitting a transaction request result over the communication network to the computing device of the user to cause the user interface application to display a notification alerting the user of the transaction request result and to enable additional functionality in the user interface application related to the transaction request result.

12. The method of claim 11, further comprising:

in response to the result indicating that the first request to complete the transaction failed, determining whether a termination threshold has been satisfied before transmitting the transaction request result; and in response to determining that the termination threshold has not been satisfied, and prior to the transmitting of the transaction request result, performing a group of operations, wherein the group of operations comprise:

receiving, from the learning agent, an identification of another payment processing gateway that is identified from the set of payment processing gateways, wherein the identification of the other payment processing gateway by the learning agent is based on the first updated policy and analysis of the data related to the transaction request;

transmitting, to the other payment processing gateway over the communication network, another request to complete the transaction based on at least the portion of the data related to the transaction request;

receiving, from the other payment processing gateway, another result of the other request to complete the transaction; and providing the other result to the learning agent for use in calculating another reward function, based on the other result, and updating the first updated policy, based on the other result and the other reward function, to generate another updated policy.

13. The method of claim 11, wherein the calculated reward comprises a real number.

14. The method of claim 13, wherein the calculating of the reward function comprises calculating a result of the equation:

$$r(s, a, f) = \delta(f)\left(1 - \left(\frac{Cost_{g_i(s,M,s,U,f)}}{\max_{g_i} Cost_{g_i}(s,M, s,U, f)}\right)\right).$$

15. The method of claim 11, wherein the policy defines a set of actions to perform given a particular state of an environment, wherein the environment comprises a plurality of states, each state being mapped to one of the set of actions, and wherein the plurality of states are defined based on the results of a plurality of requests to complete the transactions.

16. The method of claim 11, wherein the first result is selected from a set of results consisting of: a success that indicates the transaction request was processed successfully; a failure that indicates the transaction request failed to be processed successfully; and an inability to complete a gateway processing request by the payment processing gateway due to expiration of a predetermined time out period for the gateway processing request.

17. The method of claim 12, wherein the transaction request is a request to make a payment using a credit card.

18. The method of claim 11, further comprising:
performing the operations of claim 11 for at least 1000 transaction requests within a 24 hour period.

19. The method of claim 12, further comprising:
performing the operations of claim 12 for at least 1000 transaction requests within a 24 hour period.

20. The method of claim 12, wherein the policy provides a mapping of a plurality of states to a plurality of potential actions, and each state of the plurality of states is mapped to one action of the plurality of potential actions;

wherein the plurality of potential actions comprises identifications of payment processing gateways to which processing requests are able to be directed; and wherein each state of the plurality of states comprises a tuple including a card type, a transaction currency, a country of the card issuer, a result of the previous processing request, and an ordered list of zero or more payment processing gateways to which previous processing requests have been sent for the relevant card type, currency, and card issuer country.

* * * * *